US010078322B2

(12) United States Patent
Khalaf (10) Patent No.: US 10,078,322 B2
(45) Date of Patent: Sep. 18, 2018

(54) POWER TOOL SYSTEM HAVING IN-STATION VERIFICATION UTILIZING RADIO FREQUENCY SIGNAL STRENGTH (71) Applicant: Newfrey LLC, New Britain, CT (US)

(72) Inventor: Zuher Naim Khalaf, Troy, MI (US)

(73) Assignee: Newfrey LLC, New Britain, CT (US)

( * ) Notice: Subject to any disclaimer, the term of this patent is extended or adjusted under 35 U.S.C. 154(b) by 249 days.

(21) Appl. No.: 14/991,612

(22) Filed: Jan. 8, 2016

(65) Prior Publication Data
US 2017/0199509 A1    Jul. 13, 2017

(51) Int. Cl.
G05B 19/402    (2006.01)
B25B 23/147    (2006.01)
G05B 19/418    (2006.01)

(52) U.S. Cl.
CPC .......... G05B 19/402 (2013.01); B25B 23/147 (2013.01); G05B 19/41805 (2013.01);
(Continued)

(58) Field of Classification Search
CPC ................ B25B 23/147; G05B 19/402; G05B 2219/35519; G05B 19/41805; G05B 2219/45127
(Continued)

(56) References Cited

U.S. PATENT DOCUMENTS 5,666,010 A     9/1997  Stratiotis
6,005,489 A *  12/1999  Siegle ................ G08B 13/1418
                                                    310/50
(Continued)

FOREIGN PATENT DOCUMENTS

DE    10 2006 044 937 A1    4/2008
EP         1 902 817 A2     3/2008
(Continued)

OTHER PUBLICATIONS

International Search Report and Written Opinion dated Apr. 3, 2017 in corresponding application No. PCT/US2017/012162.

Primary Examiner — Chun Cao
(74) Attorney, Agent, or Firm — Harness, Dickey & Pierce, PLC (57) ABSTRACT The industrial power tool system includes a controller physically disposed in a predefined location within an assembly line work station. The controller has a first radio frequency transceiver that propagates a digital communication signal at a predefined power. A human operable portable power tool has a second radio frequency transceiver configured to communicate with the first transceiver, providing a signal strength datum indicative of the received signal strength. A processor circuit causes the tool to perform a sequence of predefined assembly job steps that are mediated by the processor circuit according to a control loop running on the processor circuit. The processor circuit compares the signal strength datum to a predefined signal strength threshold to determine if the distance between the first and second radio frequency transceivers is less than a predefined distance that defines a home area proximate the controller. The processor circuit uses the test of this distance as at least one operative step in the control loop that mediates the sequence of predefined assembly job steps.

18 Claims, 8 Drawing Sheets (52) U.S. Cl.
CPC .............. *G05B 2219/35519* (2013.01); *G05B 2219/45127* (2013.01)

(58) Field of Classification Search
USPC .......................................................... 700/160
See application file for complete search history.

(56) References Cited

U.S. PATENT DOCUMENTS

| | | | |
|---|---|---|---|
| 6,536,536 B1* | 3/2003 | Gass | ..................... B23B 31/123 173/171 |
| 6,738,685 B2 | 5/2004 | Kimmel et al. | |
| 6,845,279 B1 | 1/2005 | Gilmore et al. | |
| 6,868,742 B2 | 3/2005 | Schoeps | |
| 6,913,087 B1 | 7/2005 | Brotto et al. | |
| 7,055,233 B1 | 6/2006 | Hofer et al. | |
| 7,298,240 B2 | 11/2007 | Lamar | |
| RE41,160 E | 3/2010 | Gilmore et al. | |
| RE41,185 E | 3/2010 | Gilmore et al. | |
| 7,750,811 B2 | 7/2010 | Puzio et al. | |
| 8,169,298 B2 | 5/2012 | Wiesner et al. | |
| 8,406,697 B2 | 3/2013 | Arimura et al. | |
| 8,857,532 B2 | 10/2014 | Wallgren | |
| 8,928,463 B2* | 1/2015 | Landau | ................ G06Q 10/087 340/10.33 |
| 2007/0252675 A1* | 11/2007 | Lamar | ...................... B25F 5/00 340/5.64 |
| 2008/0135272 A1 | 6/2008 | Wallgren | |
| 2010/0023152 A1 | 1/2010 | Lysaght | |
| 2010/0091470 A1 | 4/2010 | Ostling | |
| 2010/0096151 A1 | 4/2010 | Ostling | |
| 2010/0116102 A1 | 5/2010 | Genestout | |
| 2010/0170369 A1 | 7/2010 | Yokoyama et al. | |
| 2013/0109375 A1 | 5/2013 | Zeiler et al. | |
| 2013/0127628 A1* | 5/2013 | Blaufuss | ............ G06Q 10/0833 340/686.1 |
| 2013/0277078 A1 | 10/2013 | Wallgren | |
| 2013/0324156 A1 | 12/2013 | Wallgren | |
| 2014/0240125 A1 | 8/2014 | Burch et al. | |
| 2015/0069852 A1 | 3/2015 | Lindstrom | |
| 2015/0277428 A1 | 10/2015 | Dackefjord | |

FOREIGN PATENT DOCUMENTS

| | | |
|---|---|---|
| EP | 2 039 461 A2 | 3/2009 |
| WO | 2008/125194 A2 | 10/2008 |
| WO | 2010/053422 A1 | 5/2010 |
| WO | 2010/066375 A1 | 6/2010 |
| WO | 2010/074628 A1 | 7/2010 |
| WO | 2012/107300 A1 | 8/2012 |
| WO | 2013/063507 A1 | 5/2013 |
| WO | 2013/116303 A1 | 8/2013 |
| WO | 2013/164265 A1 | 11/2013 |
| WO | 2015/024686 A1 | 2/2015 |

* cited by examiner

```
1  void ZONE_CONTROL::ProcessEvents(EVENTS event, int32 lParam,
      EVENT_TYPE eventType, MAC_IDS srcAddr)
2  {
3      switch(event){
4      case MSG_CONNECT:
5          PostEvent(MSG_IN_ZONE, in_zone);
6          break;
7
8      case MSG_RND_START:
9      case MSG_RND_HOME_START:
10     case MSG_RND_DISASSEMBLY_START:
11         tool_running = true;
12         break;
13
14     case MSG_RND_END:
15     case MSG_RND_HOME_END:
16     case MSG_RND_DISASSEMBLY_END:
17         tool_running = false;
18         if (stop_pending)
19             Stop(true);
20         break;
21
22     case MSG_JOB_COMPLETE:
23         if (!in_zone && zone.mode == zone.ON_JOB_RESET && Byte2(lParam)
             /*job_complete*/ && Byte1(lParam)/*auto_reset_job*/){
24             Stop(true);
25         }
26         break;
27
28     case MSG_PARTENTRY:
29         if (!in_zone && zone.mode == zone.ON_JOB_RESET && !Byte0(lParam)
             /*auto_reset_job*/){
30             Stop(true);
31         }
32         break;
33
34     case MSG_FILE_LOAD_SUCCESSFUL:
35         if (Word1(lParam) == MyAddress()){
36             switch (Word0(lParam)){
37             case SYSTEM_INI:
38                 zone.load(NULL);
39                 checkZone();
40                 break;
41             }
42         }
43         break;
44     }
45 }
```

Fig. 7

```
1 void ZONE_CONTROL::UpdateSensorRequest(SENSORS sensor, Int32 lParam, MAC_IDS srcAddr)
2 {
3      if (sensor == SENSOR_RSSI){
4          bool in_zone_ = (lParam <= 0L-((Int32)(zone.area)))?0:1;
5
6          if (in_zone != in_zone_){
7              in_zone = in_zone_;
8              PostEvent(MSG_IN_ZONE, in_zone);
9              checkZone();
10         }
11     }
12 }
```

POWER TOOL SYSTEM HAVING IN-STATION VERIFICATION UTILIZING RADIO FREQUENCY SIGNAL STRENGTH

FIELD

The present disclosure relates generally to industrial power tool systems. More particularly, the disclosure relates to a power tool system in which a portable power tool includes a processor that mediates a sequence of assembly steps.

BACKGROUND

This section provides background information related to the present disclosure which is not necessarily prior art.

In a factory setting it is common for assembly line workers to work in close proximity. Typically, different workstations, each dedicated to a different step in the assembly process, are sequentially arranged along the assembly line. Although workers in adjacent workstations may be using the same type of power tool, the individual settings of those tools may be very different. By way of example, two adjacent workers may each be using the same type of portable fastening tool. However, their respective jobs may require different fastener installation torques to be used. If one worker inadvertently picks up his neighbor's tool after returning from lunch, for example, it is possible that the wrong tool settings (e.g., wrong torque) would inadvertently be used. This inadvertent tool swapping is even more likely to occur where the tools are wirelessly controlled with no umbilical cord to trace back.

SUMMARY

This section provides a general summary of the disclosure, and is not a comprehensive disclosure of its full scope or all of its features.

The disclosed tool improvement addresses the problem of multiple operators working in close proximity unintentionally exchanging tools. The disclosed system does this without the need for expensive factory-wide tool identification and tracking systems. Instead, the disclosed improvement employs simple short-range wireless radio frequency (RF) transceiver pairs, one in the tool itself and one in an electrical component such as the tool controller box. The controller is physically installed at a fixed location associated with the workstation and transmits a short-range radio signal, whose strength is used by the tool to determine if the tool is within a predefined home area proximate the controller.

More specifically, a processor-controlled logic circuit coupled to one of the pair of wireless transceivers acquires data from the transceiver about the reported signal strength of the signal received from the other one of the transceiver pairs. RF signal strength diminishes in proportion to the square of the distance between source and destination. The processor-controlled logic circuit thus assesses distance between tool and controller box using signal strength as a measure of proximity. In a preferred embodiment the RF signal carries WiFi data with the controller functioning as a base station and the tool functioning as a client station.

The processor-controlled logic circuit on-board the tool is programmed to discriminate between signal strengths above and below a predefined threshold. When the signal strength is above the threshold, the circuit on-board the tool enables the tool. When the signal strength is below the threshold, the circuit on-board the tool disables the tool.

Thus when the worker wants to begin using the tool, he or she picks up the tool and moves to a home area that is within a radial distance from the control box; within this radial distance the signal strength is above the threshold. The logic circuit then enables the tool, whereupon it can be moved outside the home area to perform work.

The processor-controlled logic circuit on-board the tool can be configured to mediate a variety of different assembly jobs. By way of a few non-limiting examples, the logic circuit can implement an on wake procedure or use case where the tool is awakened by pressing the start trigger. The processor then checks to see if the tool is in the home area and enables the tool only if it is. If the tool is not in the home area, it will enable once it enters the home area. In this use case the tool then remains enabled until it reverts to an energy-saving sleep mode or until the battery is removed. The logic circuit can also implement an on reset procedure or use case: when the tool finishes its preprogrammed assembly job (e.g., a predefined number of fasteners has been installed), the processor disables the tool. The tool is then disabled until a job reset command is issued and the tool has entered (or is already in) the home area. The logic circuit can further implement an on time procedure or use case: when the tool moves beyond the home area the processor initiates a timer. If the timer ends before the tool returns to the home area the tool is disabled. Other use cases are also envisioned.

Therefore, according to one aspect, disclosed is an industrial power tool system for use on a production line having plural work stations. The power tool system includes a controller that is physically disposed in a predefined location within one of said work stations; the controller has a first radio frequency transceiver configured to propagate a digital communication signal at a predefined power. The system also includes a human operable portable power tool having a second radio frequency transceiver configured to communicate with the first radio frequency transceiver and providing a signal strength datum indicative of the received signal strength of the propagated digital communication signal of the first radio frequency transceiver.

The portable power tool has a processor circuit that is programmed to cause the tool to perform a sequence of predefined assembly job steps that are mediated by the processor circuit according to a control loop running on the processor circuit. This processor circuit is programmed to interrogate the signal strength datum and to compare the signal strength datum to a predefined signal strength threshold to thereby determine if the distance between the first and second radio frequency transceivers is less than a predefined distance that defines a home area proximate the controller. The processor circuit is further programmed to test whether the tool is within the home area using said signal strength comparison and to use said test as at least one operative step in the control loop that mediates the sequence of predefined assembly job steps.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The disclosed principles for improving industrial power tool systems can take many forms. Therefore, by way of example, a single spindle pistol grip cordless tightening tool with accompanying controller has been illustrated in FIG. 1. It will be understood that the principles disclosed here can be applied to other tool configurations as well.

Figure 1:
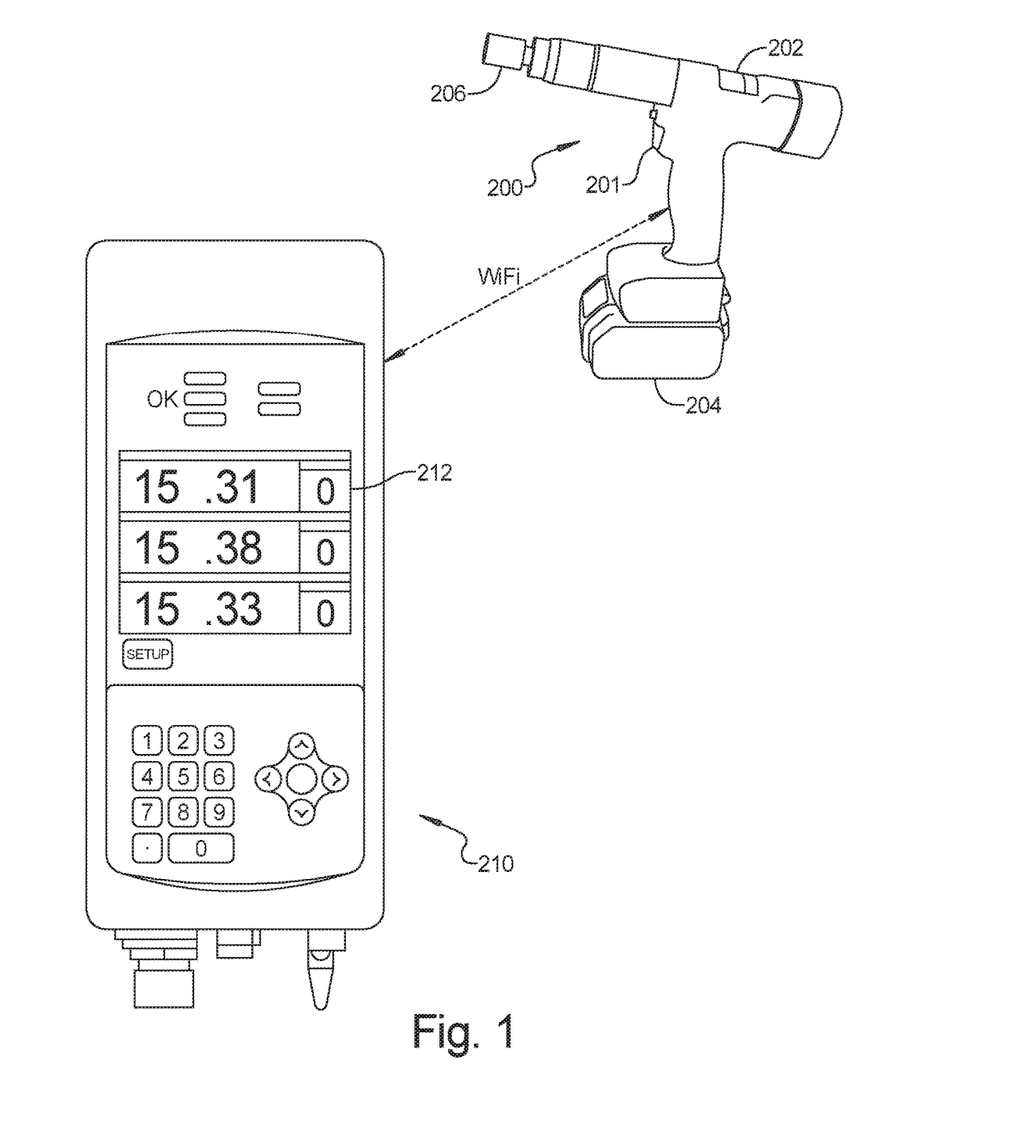
FIG. 1 is a perspective view of an exemplary portable fastening tool and controller operatively communicating via digital radio frequency (e.g., WiFi) signals.

Thus as shown in FIG. 1 the portable tool is shown at 200. The tool includes trigger switch 201 which the user can depress to operate the tool. A panel of LED lights at 202 shows various operating state information to the human operator, including an LED that illuminates when the tool is enabled and ready for use. Being cordless, the tool includes a detachable battery pack 204. The tool is capable of accepting a range of different interchangeable sockets to accommodate different sized fasteners, socket 206 being shown attached. The tool communicates wirelessly, via WiFi digital control signals with the controller 210. The controller 210 may be coupled wirelessly and via multi-conductor cables with other tools and sensors within the industrial work site. The controller provides a display 212 showing pertinent information to the tool operator.

Factory Environment

Figure 2:
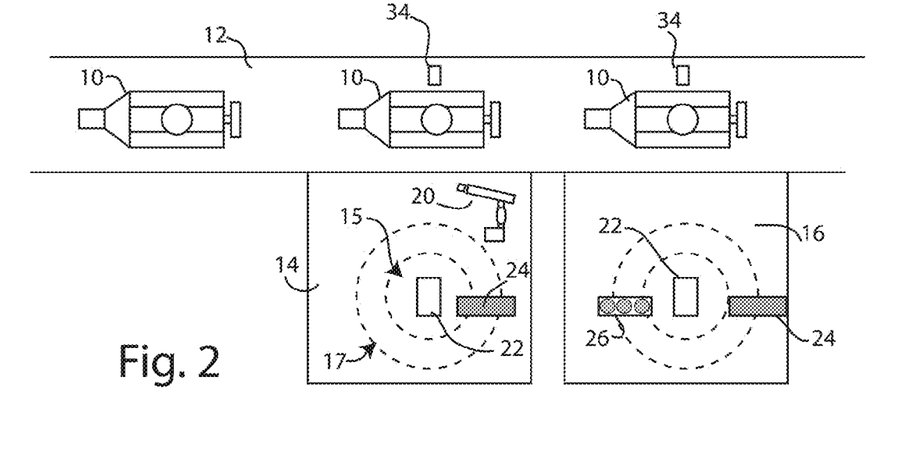
FIG. 2 is a diagrammatic view of an exemplary assembly line environment showing placement of the controller to define the home area.

To illustrate the principles of the disclosed system, a portion of an exemplary assembly line is shown in FIG. 2. In this example, the workpiece is the engine 10 for an automobile that travels through a work zone, past a series of assembly stations 14 and 16. At each assembly station a worker uses a tool 20, which has been specifically programmed to perform the specific task required at that assembly station. For example, at station 14 the worker may be installing fasteners to secure the alternator to the engine; at station 16 the worker may be installing the fuel pump to the engine. Although each of these workers may be using bolts with the same head size, the required torques to secure the alternator and fuel pump may be different. Thus the workers need to ensure that they do not inadvertently use each other's tools, or both alternator and fuel pump will be installed using the wrong torque.

The disclosed system prevents this tool selection error by a processor-controlled logic circuit and associated wireless (WiFi) communication system, as will be more fully described below. The basic components of this system comprise the tool 20 and a controller 22. The controller 22 is physically situated at a predesignated location, such as near the parts bin 24 or near the tool socket tray 26. Preferably, the controller 22 should be situated near something within the assembly station that the worker will frequently visit. In the example shown in FIG. 2, the worker would visit the parts bin 24 to acquire the requisite number of bolts needed to install the respective alternator or fuel pump, depending on the step being performed at that station. If different sized fasteners are used at an assembly station, the worker would visit the tool socket tray 26 to retrieve the socket of proper size for the fastener being installed. In some applications this socket tray may be provided with electronic sensors or switches that are coupled to the controller 22. In this way the controller learns what socket has been installed on the tool and can communicate that information to other systems within the manufacturing operation (including to the tool itself).

Tool System Architecture

Figure 3:
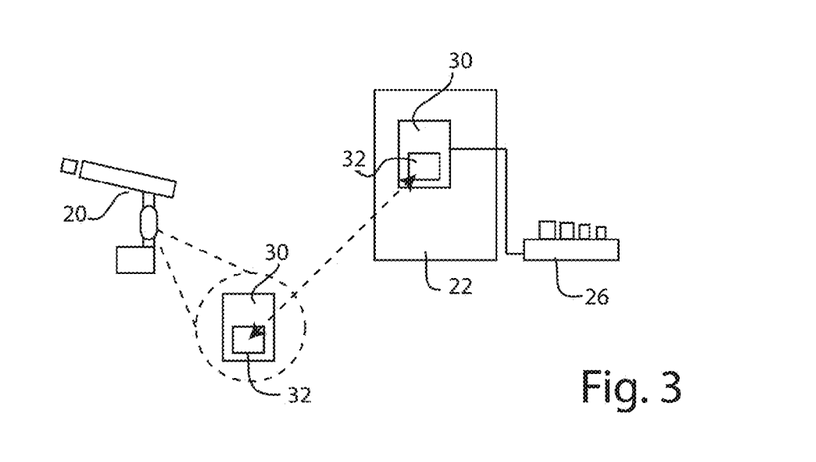
FIG. 3 is a block diagram of the portable tool and controller, illustrating digital radio frequency coupling between tool and controller and further illustrating hard-wired connection between controller and socket tray.

As shown in FIG. 3, the tool 20 and the controller 22 each have a logic circuit board that includes a wireless transceiver 32 that operates according to a suitable digital communication protocol, such as a WiFi protocol. From a system standpoint the transceiver 32 within the controller 22 operates as an access point station while the transceiver 32 within the tool operates in station (client) mode. For each assembly station the access point and client are paired, such as by configuring the base station transceiver in the controller to accept communications from only the terminal transceiver within the tool. This can be done by using the MAC address of the terminal transceiver to identify a particular tool as all MAC addresses are different.

The tool and controller thus enjoy WiFi communication between them, and this communication channel is used to supply sensor information to the tool and also to supply message packets from the tool to the controller. In the presently preferred embodiment, the logic circuit board 30 within the tool provides nearly all of the tool's functionality. Thus the tool, once enabled, can operate independently from the controller. Depending on the assembly line operation, however, the logic circuit board 30 within the controller can provide trigger signals and data used by the logic circuit board 30 within the tool. Thus, in the example of FIG. 2, the tool socket tray 26 may be electrically connected to the logic circuit board 30 of the controller; and the controller can thus ascertain which socket has been removed from the holder and report that information to the tool. Likewise, a workpiece sensor or sensing switch installed on the assembly line, as at 34 (FIG. 2), can be connected to the logic circuit board 30 of the controller to supply a signal when a new workpiece arrives at the assembly station waiting to be worked upon.

The controller can relay this information to the tool, and the tool then uses this information to perform its preprogrammed sequence of operations.

As with any radio frequency signal, the WiFi signal emanating from the controller's transceiver 32 drops in signal strength in proportion to the square of the distance from the transceiver's antenna. The WiFi signal emanating from the transceiver's antenna defines a generally spherical signal zone centered on the transceiver antenna. The disclosed system defines a predefined signal strength threshold, above which the signal is deemed to be within the home area, as illustrated at 15 in FIG. 2. This home area represents a generally spherical location within a sufficiently close radial distance from the transceiver antenna to reliably ensure that the signal strength will be above the predefined signal strength threshold. There is a concentric region 17 radially outward of the home region 15 where the signal strength may sometimes momentarily exceed the predefined signal threshold but not reliably and consistently so. Thus to ensure reliable operation the home region is defined as a locus of points radially arranged from the antenna location such that the radio frequency signal strength is reliably (greater than 95% likely) above a predefined signal strength. For example, the predefined signal strength may be −30 dBm. The radius that will reliably lie within this predefined signal strength can be varied by varying the output power of the transceiver.

Wireless Tool Architecture

Figure 4:
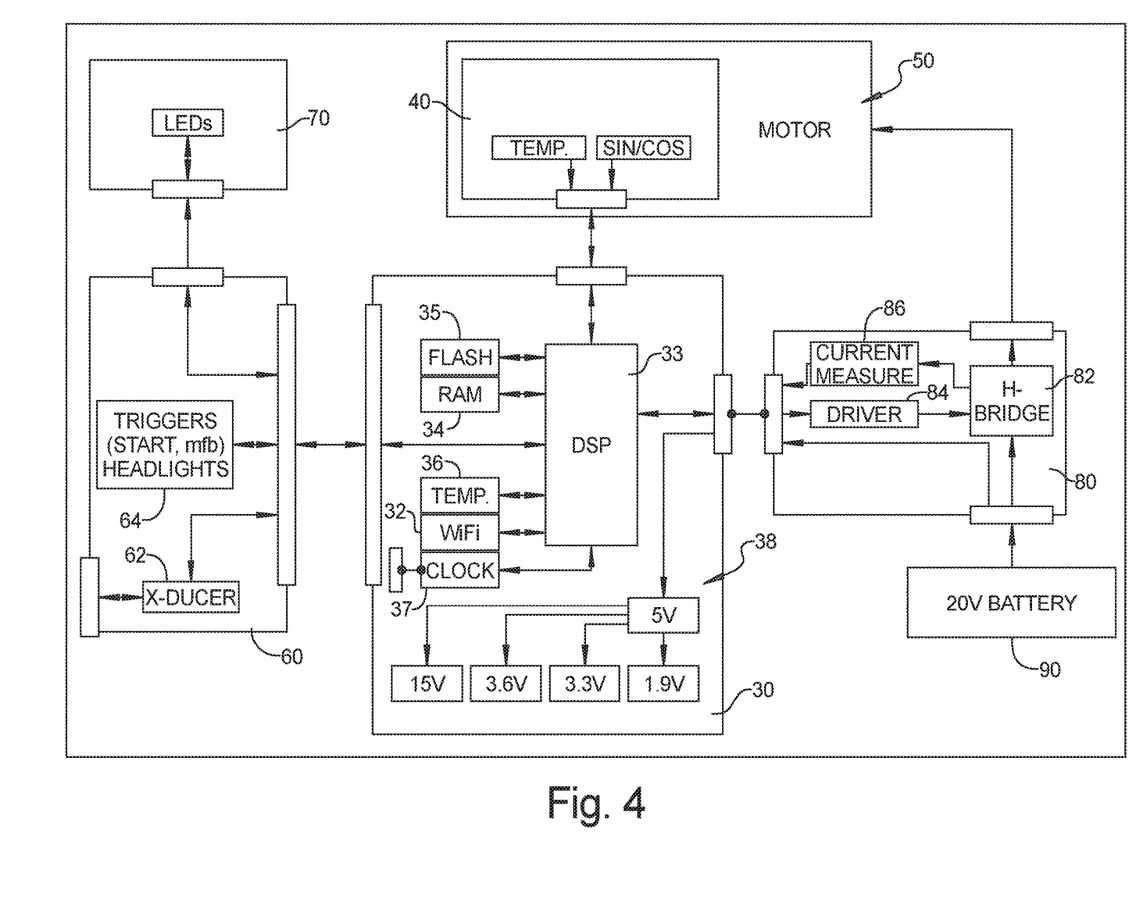
FIG. 4 is a block diagram of the logic circuit board installed in the portable tool.

Referring to FIG. 4, the electronic components of the wireless tool have been illustrated. These electronic components include the logic circuit board 30, a motor rotor feedback circuit 40 to which the motor 50 is coupled, a trigger handling circuit 60 (providing trigger 22 of FIG. 1), a multi-function panel 70 (providing the LED lights 202 of FIG. 1) and a high current driver circuit 80 to which the rechargeable battery 90 is connected. These components are electrically connected as illustrated.

The logic circuit board 30 includes a digital signal processor (DSP) circuit 33 which works in conjunction with attached random access memory (RAM) 34 and Flash memory 35. The logic circuit board 30 also includes a temperature sensor 36, a real time clock circuit 37 and a WiFi transceiver circuit 32 (as also seen in FIG. 3). The logic circuit board also includes a power supply section 38 that provides a plurality of different DC supply voltages as illustrated: 5V, 15V, 3.6V, 3.3V and 1.9V. These supply voltages are provided to support the other components that are attached to the logic circuit board 30.

The motor rotor feedback circuit 40 has a mechanism, such as a resolver or disk magnet array, to sense the rotational position of the motor. The sensed position data are used by the DSP processor to generate pulse-width-modulated waveforms that cause the motor coils to be energized sinusoidally.

The trigger handling circuit 60 includes transducer circuitry 62 that processes inputs from the manual trigger disposed within the tool as well as other operator manipulatable controls. The trigger handling circuit thus communicates operator trigger events and other control events to the processor 33. In addition, the trigger handling circuit turns on and off headlights to aid in illuminating the workpiece.

Figure 5:
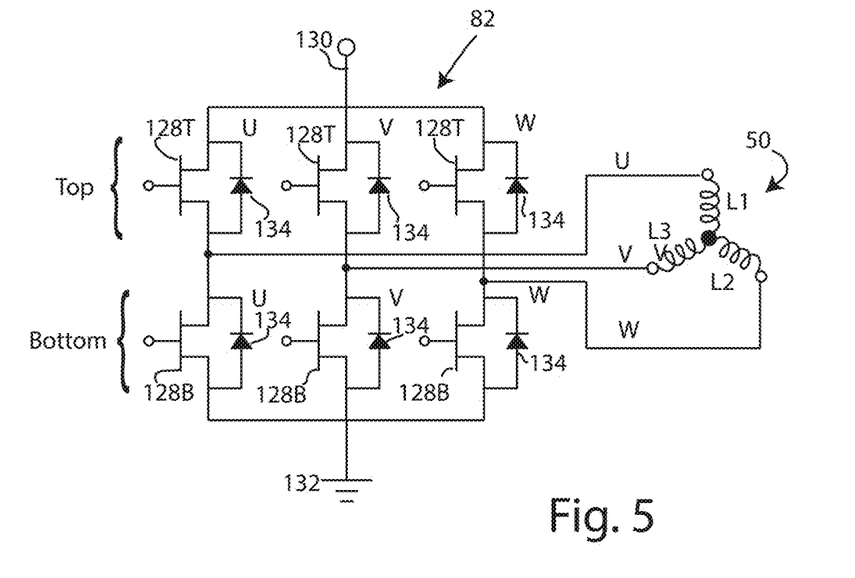
FIG. 5 is a detailed circuit diagram of the H-bridge circuit and three-phase motor employed in the logic circuit board of the portable tool.

The high current driver circuit includes a three-phase H-bridge circuit 82, shown in FIG. 5, as well as the three-phase driver circuit 84 that supplies the pulse width modulated drive signals to the H-bridge to produce three-phase sine wave drive currents in the three phases of the motor windings. The processor 33 on the logic board 30 supplies the on-off signals to produce these pulse width modulated drive signals. A current measurement circuit 86 monitors the currents and supplies data signals of motor current back to the processor 33.

H-Bridge Circuit

Referring to FIG. 5, the H-bridge circuit 82 is shown in greater detail, attached to an exemplary three-phase motor 50, supplied with three-phase alternating current through the H-bridge circuit 82. The H-bridge circuit employs a collection of six switching transistors, such as field effect transistors 128T and 128B, that are each turned on and off by drive signals applied to the respective gate terminals by the processor 33 (FIG. 4). Across each of the switching transistors is a diode 134.

The switching transistors are organized into two banks of three transistors each; transistors 128T define a top bank, while transistors 128B define a bottom bank, as illustrated. The transistors 128T in the top bank are coupled to the DC supply rail 130, while the transistors 128B in the bottom bank are coupled to the ground rail 132. The top and bottom banks are connected together as illustrated to define pairs of transistors, designated U, V and W. Each pair is connected to a different one of the three motor terminals, also designated U, V and W. Each of the three pairs can be selectively energized to either connect its corresponding motor terminal to the DC supply rail 130 or to the ground rail 132. For example, when transistor 128T-U is switched on and transistor 128B-U is switched off, the motor terminal U is electrically connected to DC supply rail 130. Conversely, when transistor 128T-U is switched off and transistor 128B-U is switched on, the motor terminal U is electrically connected to ground rail 132.

The processor 33 is programmed to selectively switch the transistors to cause currents to flow through the respective motor coils in the desired flow direction and at the desired time. For example, by switching transistor 128T-U on, while concurrently switching transistor 128B-V on, current flows through coil L1 in a direction from terminal U to terminal V. To induce current flow through coil L1 in the opposite direction, the computer or processor would turn on transistors 128T-V and 128B-U. In this fashion the computer or processor 33 can cause current to selectively flow in either direction through each of the three motor coils. Within any given pair of top and bottom bank transistors, the computer or processor 33 is programmed not to switch both top and bottom transistors on at the same time, as this would provide a short circuit between the DC supply rail 130 and ground rail 132.

The respective drive signals are controlled by the computer 33 in a coordinated fashion so that each of the three motor coils L1, L2 and L3 is energized with the proper alternating current waveform. Specifically, the switching transistors are switched on and off in precisely controlled time sequences to produce three pulse-width modulated signals that produce three sinusoidal alternating current drive currents in the three motor windings.

Event-Driven Control Structure

In addition to supplying the basic pulse-width modulated drive signals, processor 33 is also responsible for mediating the higher level assembly task-oriented or job-oriented instructions. For example, if a particular assembly step requires installation of two bolts, processor 33 is programmed to count when both of those steps have been accomplished, whereupon the tool is de-energized, awaiting a reset signal to begin the next job. More specifically, the processor 33 is programmed to implement an event-driven control loop that can be programmatically changed depending on the job to be performed.

Figure 6A:
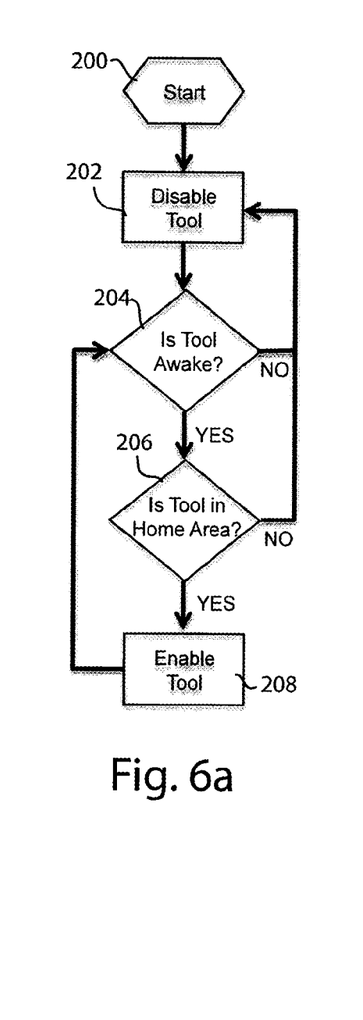
FIG. 6a is a flowchart depicting the On-Wake job control sequence performed by the logic circuit board of the portable tool.
Figure 6B:
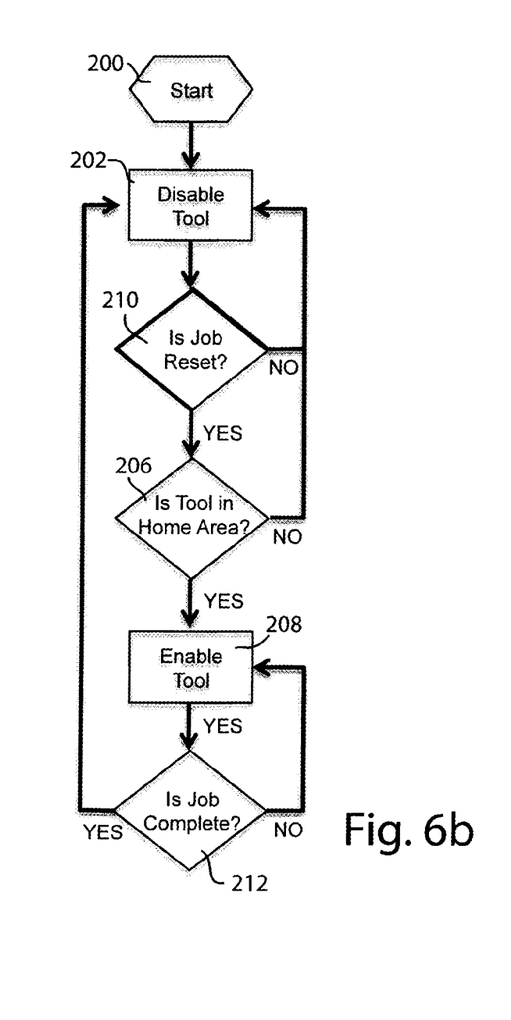
FIG. 6b is a flowchart depicting the On-Job-Reset job control sequence performed by the logic circuit board of the portable tool.
Figure 6C:
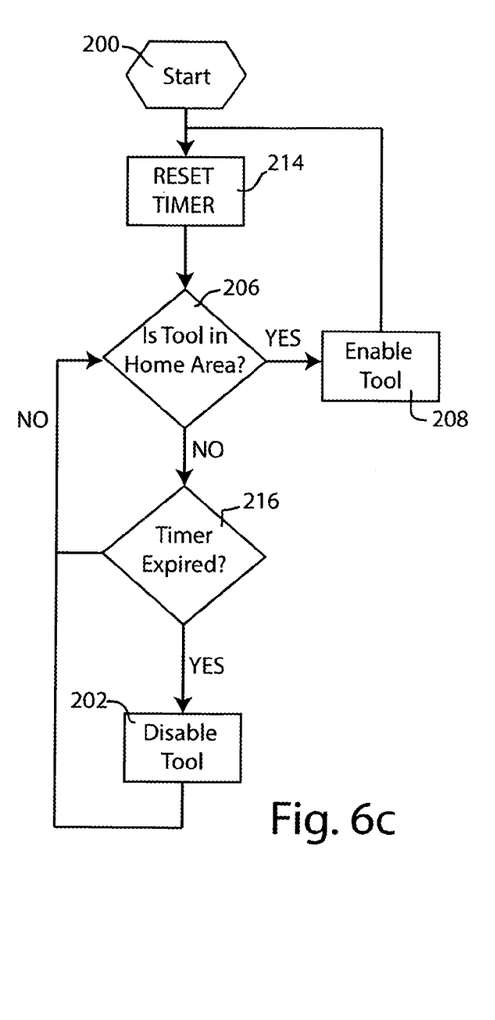
FIG. 6c is a flowchart depicting the On-Time job control sequence performed by the logic circuit board of the portable tool.

FIGS. 6a-6c show some exemplary event-driven control loops. These exemplary control loops illustrate some of the possible use cases within a factory assembly line environment. Other use cases are also envisioned. Before looking at each of these use cases, some general information about the event-driven control loop architecture may be helpful. Because the tool is battery-operated, the processor 33 has the ability to put the tool into a battery-conserving sleep state. In this sleep state many of the circuits are de-energized. A wake up signal can be provided by pressing the trigger of the handheld tool. Once awakened, the processor loads a selected one of a plurality of event-driven control loop programs and begins running that control loop. The processor stores information in memory that identifies which control loop program to load and run upon wake-up.

On-Wake

In FIG. 6a the On-Wake use case is illustrated. In this use case the tool is awakened by pressing the start trigger on the handheld tool as at 200. Unlike a conventional tool that would immediately start operating when the trigger is pressed, in this use case the event-driven control loop enters a disable tool state as at 202. If the tool is not awake (i.e., still in the sleep state) at step 204, the control loop simply cycles back to the disable tool state 202.

If the tool is awake, the control loop tests at step 206 whether the tool is in the home area (such as home area 15 of FIG. 2). If so, the tool is placed in the enabled state at step 208. If not, the control loop returns to step 202 where the disabled state is entered.

It is important to understand that once the tool is enabled at step 208, the tool can be moved away from the home area. Thus it is not necessary to perform the assembly job function (e.g., of securing fasteners to the workpiece) while within the home area. The home area may instead be thought of as an area that the worker will periodically visit, as dictated by the particular assembly job assignment. Thus the test of whether the tool is in the home area (e.g., step 206) is simply an event that the control loop program responds to as part of its normal cycle of operations. The test for home area presence, which relies on assessment of signal strength, is only required when the control loop dictates.

Thus the On-Wake use case causes the tool to be awakened by pressing the start trigger. The processor then looks to see if the tool is in the home area (the applicable in-station verification zone). If the tool is in the verification zone or home area, the processor enables the tool until the tool goes to sleep again or until the battery is removed. If the tool is not in the home area, then it remains disabled.

On-Job-Reset

In FIG. 6b the On-Job-Reset use case is illustrated. Some of the steps involved in this use case are the same as those of the On-Wake case (FIG. 6a). Where the steps are the same, like reference numerals have been used. The On-Job-Reset use case may be used, for example, where the assembly steps follow a predefined sequence and then must be reset when a new workpiece arrives on the assembly line. Thus the control loop for the On-Job-Reset use case begins when the start trigger is pressed at 200. As in the On-Wake case, the tool is then placed in the disabled state at 202. If a job reset signal is sent, such as by a command signal from the assembly line (which may be triggered, for example, by a sensor or switch 34 when a new workpiece arrives on the assembly line), the processor responds at step 210 by passing control to step 206, which tests whether the tool is in the home area or verification zone, as discussed above. Until a job reset signal is received, the control loop continues to cycle back to the disable tool state 202.

If the tool is in the home area or verification zone when the control loop reaches step 206, the control loop passes control to step 208 where the tool is enabled. As illustrated, the tool then remains in the enabled state until the job is complete at step 212. In this regard, note that the job complete test may involve many sub-steps (not shown) that would correspond to each of the assembly processes needed to be performed. This could be a simple process, like attaching two fasteners to the work piece; or it could be a more complex process requiring several socket changes to accommodate different sized fasteners, possibly using different preprogrammed torques.

On-Time

In FIG. 6c the On-Time use case is illustrated. As before, like steps have been given like reference numerals. In this use case when the tool moves outside the home area or verification zone a timer initiated by the processor begins to count down. If the timer ends before the tool returns to the home area, it will be disabled until it returns to the home area. Thus as illustrated, after the process begins at 200, the timer is reset at 214. If the tool is in the home area, as tested at 206, the tool is enabled at 208 and control returns to step 214 which again resets the timer. Thus so long as the tool remains in the home area the tool is enabled and the timer is continually reset.

If the tool is not in the home area at step 206, control proceeds to step 216 where a check is performed to determine if the timer has expired. If it has not expired, control simply loops back to step 206. If the tool remains outside the home area long enough for the timer to expire, the test at step 216 passes control to step 202 where the tool is disabled. The timer restarts if the tool enters the home area.

Details of Exemplary Source Code

To provide additional details about how the processor 33 is programmed, the following excerpts of executable code will be discussed. It will be understood that this code may be stored in the internal memory within the DSP or alternately in the Flash RAM 34 (FIG. 4) and accessed by the processor 33 causing it to perform the steps described by the code.

In the disclosed embodiment the control loop implemented by processor 33 is event-driven. Thus the control loop periodically processes events and, as part of this periodic processing, the control loop assesses WiFi signal strength. More specifically, the control loop code is written so that an event is triggered when the signal strength changes. Thus signal strength change is also a triggering event within the control loop.

Figure 7:
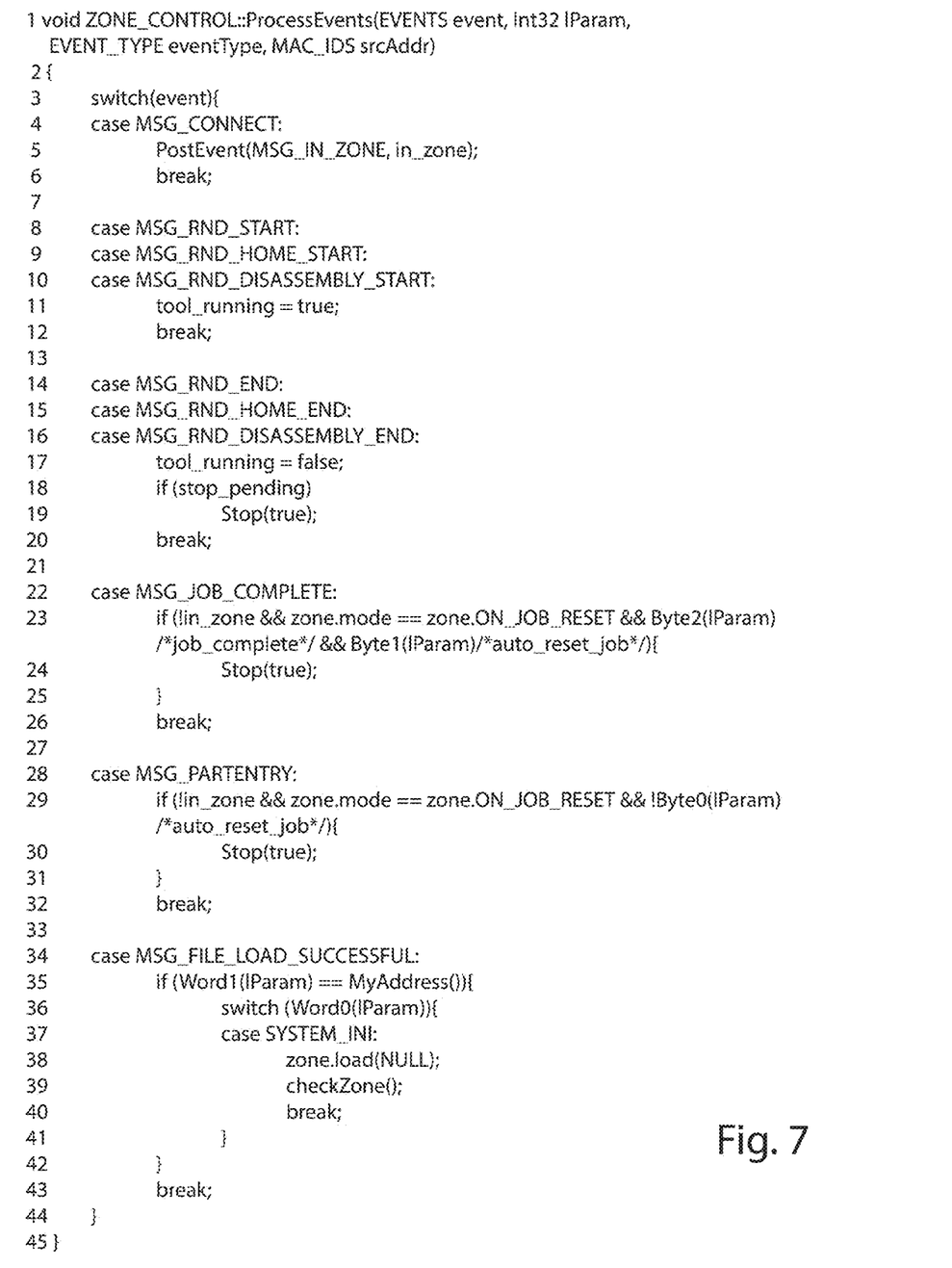
FIG. 7 is an excerpt of program code illustrating how the job control sequences are implemented by the processor (DSP) on the logic circuit board of the portable tool.

The excerpt of code in FIG. 7 shows how the basic control loop may be configured to process events. The code of FIG. 7 comprises a sequence of case statements that each performs the identified function if the specified conditions are met. Note how several of the case statements test the "in_zone" condition or the not in zone condition (!in_zone). See, for example, line 23 of the case MSG_JOB_COMPLETE statement and line 29 of the case MSG_PARTENTRY statement where the not in zone (!in_zone) condition is part of the case statement test. This in_zone condition is maintained by the processor by setting and resetting a flag in memory whenever a change in signal strength warrants.

Figure 8:
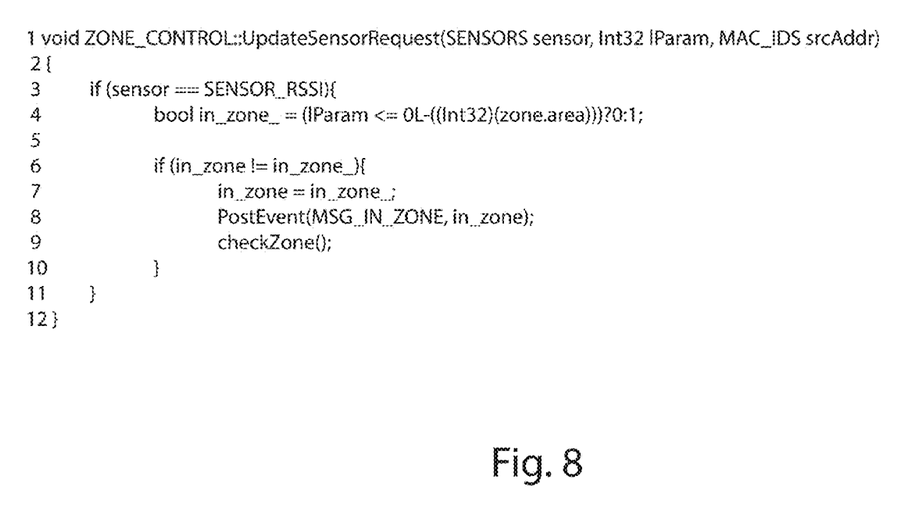
FIG. 8 is an excerpt of program code illustrating how the processor (DSP) of the portable tool is programmed to test and use the signal strength parameter to generate an event used by the job control sequence.

The code responsible for setting or resetting the in_zone flag is shown in FIG. 8. In the illustrated code, the received signal strength sensor is designated as SENSOR_RSSI. The Boolean flag in_zone is set by the IF statement spanning lines 3-11. At line 4 the predefined signal strength is stored as variable zone.area. This can be represented as a numeric constant (in dBm) below which the tool is deemed to be outside the zone (outside the home area). Thus at line 4 the signal strength reported by the WiFi transceiver 32 on the tool's logic circuit board 30 (FIG. 4) is represented by the variable IParam. This value is compared to determine if it is less than or equal to the predefined signal strength stored by the zone.area numeric constant. If the test reveals the actual signal strength is equal to or below the predefined signal strength, the IF statement fails. However, if the actual signal strength is NOT equal to or below the predefined signal strength, the IF statement succeeds and the further steps at lines 6-8 are performed. These steps involve setting the in_zone flag equal to the condition (in_zone_) that passed the test, and then sending a PostEvent message alerting other interested processes that the tool is in_zone (i.e., within the home area).

Information and Control Architecture

Figure 9:
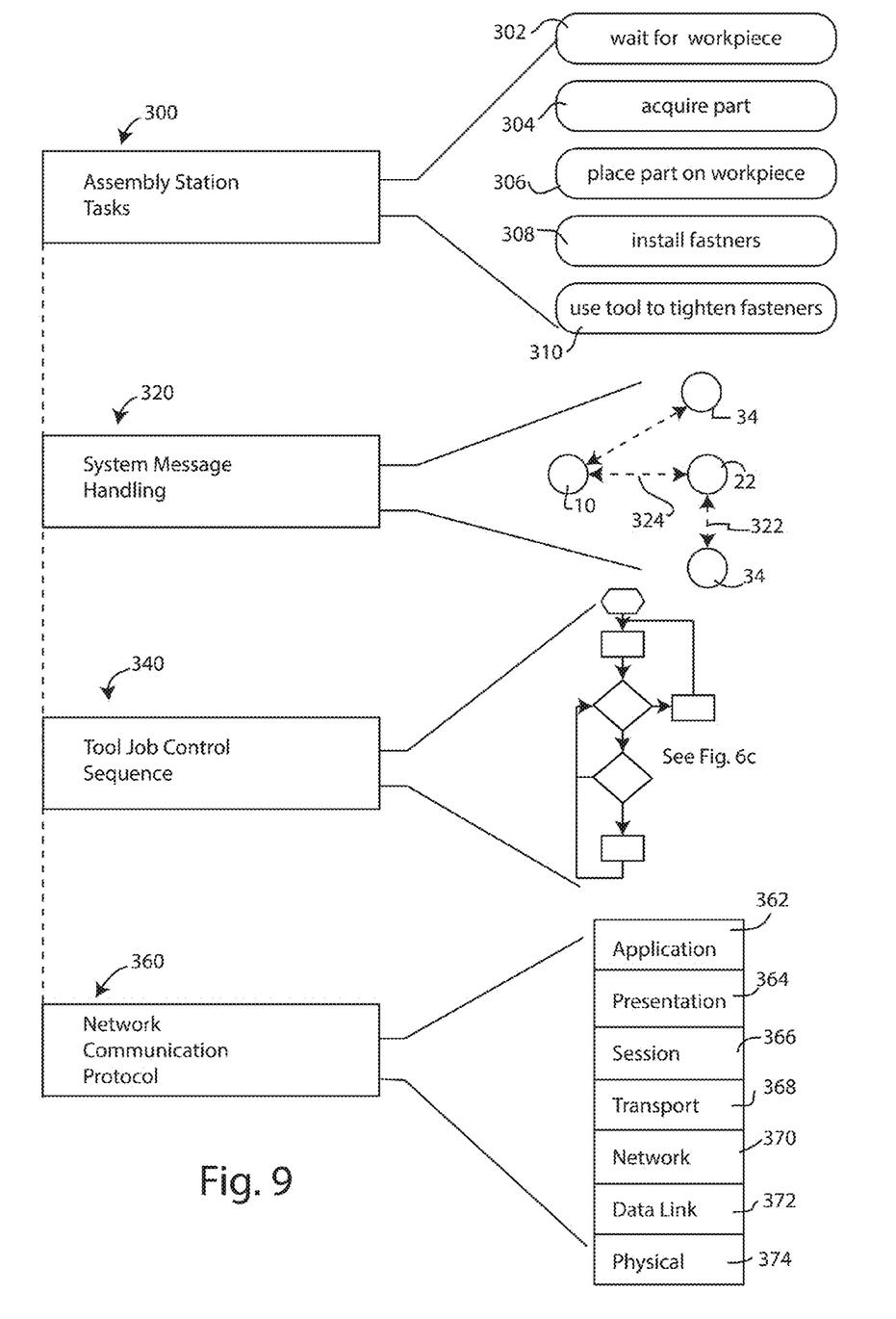
FIG. 9 is an information and control architecture diagram illustrating some of the operating principles of the disclosed power tool system.

The disclosed power tool system implements an information and control architecture that will be better understood with reference to FIG. 9, which shows how the various information exchanges and control steps fall into different architectural layers. At the top layer 300 reside the assembly station tasks. As illustrated, these tasks comprise the individual steps performed by the worker using the tool at an assembly station. Thus at the assembly station task level 300 the assembly process being performed involves steps such as: wait for the workpiece (e.g., engine) to arrive at the assembly station 302, acquire part (e.g. water pump) from parts bin 304, place part on workpiece 306, install fasteners 308, and use tool to tighten fasteners 310. Although the worker moved in close proximity to the controller 22 in acquiring the part from the parts bin at step 304, the automatically performed step of ensuring the correct tool is in hand is not overtly apparent to the worker. This checking step happens invisibly and automatically and is performed at a layer far below in the information and control architecture.

Some of the steps at the assembly station task level 300 require information from electronic systems deployed along the assembly line. For example, to determine when the workpiece has arrived at the work station, a sensor or limit switch is interrogated by the controller 22 and the controller 22, in turn, communicates this information to the tool 20. This inter-system message communication occurs in the system message handling layer 320. In an exemplary assembly plant that employs a computer network as part of its communication infrastructure, these inter-system messages would typically be communicated over the computer network. Thus in system message handling layer 320, the limit switch or sensor 34 communicates its change of state as an event message 322 to which a particular controller 22 subscribes. The subscribing controller stores the extant state of the limit switch or sensor in its memory and is programmed to exchange that state information with the tool at step 324.

Below the system message handling layer resides the tool control logic layer 340. At this layer the flow control logic exemplified by the control processes of FIGS. 6a-6c are performed. The control logic steps in layer 340 thus establish how the tool will respond when the worker attempts to use the tool (e.g., to tighten the fastener at step 310 in layer 300). If the tool has been placed in the enabled state via the applicable tool flow control logic (e.g., FIGS. 6a-6c), then the tightening step is permitted to proceed. If not in the enabled state, the fastening step is inhibited.

As noted, many of the steps performed in the system message handling layer 320 involve network communication. Communication between two stationary devices, as between the sensor or limit switch 34 and the controller 22, can be hardwired to communicate over the network via suitable Ethernet cables or the like. However, tool 10 is portable and thus a suitable wireless communication mechanism is provided. In a presently preferred embodiment wireless communication is provided using WiFi (i.e., IEEE 802.11 standards).

The WiFi protocol itself is architecturally divided into communication layers according to the OSI model. The OSI model defines seven layers: Application layer 362 (highest), Presentation layer 364, Session layer 364, Transport layer 366, Network layer 368, Data Link layer 370, and Physical layer 372 (lowest). The WiFi standard subdivides the Data Link layer into a Media Access Control (MAC) layer and a Logical Link (LLC) layer. The MAC layer is responsible for moving data packets between Network Interface Cards (NIC) of two communicating devices across a shared channel on the network. The LLC layer is responsible for message frame synchronization, flow control and error checking.

Thus the information communicated between the portable tool and other devices within the assembly plant relies on the Data Link layer (and layers above) to convey information. From the information exchange standpoint, the OSI Physical layer 372 is essentially irrelevant. In other words, messages between devices—as between the tool and its controller, or as between the controller and a sensor or limit switch— occur without regard to the physical mechanism responsible for the communication. In other words, such information communication would be the same whether the signal is sent by Ethernet, WiFi, or even infrared.

One important and unique aspect of the disclosed tool control system is that the signal strength information used to determine if the tool is within the home area is not communicated in any of the OSI layers 362-370 described above. Rather, signal strength information is communicated as part of the Physical layer 372. In this regard, normally signal strength of a WiFi signal is communicated to allow the communicating devices to determine if communication is feasible. If the signal strength is insufficient, communication may not even be attempted. However, the disclosed power tool control system advantageously uses this signal strength information for the entirely different purpose of determining if the tool is in proximity to the home area. In essence, the disclosed power tool control system exploits a mechanism that is provided as part of the WiFi protocol for an entirely different purpose. The result is an elegant, effective and quite economical way of ascertaining whether the portable tool is or has been present within the home area.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An industrial power tool system for use on a production line having plural work stations, comprising
a controller physically disposed in a predefined location within a first one of said work stations, the controller having a first radio frequency transceiver configured to propagate a digital communication signal at a predefined power;

a human operable portable power tool having a second radio frequency transceiver configured to communicate with the first radio frequency transceiver and providing a signal strength datum indicative of the received signal strength of the propagated digital communication signal of the first radio frequency transceiver;

the portable power tool having a processor circuit that is programmed to cause the tool to perform a sequence of predefined assembly job steps that are mediated by the processor circuit according to an event-driven control loop running on the processor circuit;

wherein the processor circuit is programmed as part of the event-driven control loop to interrogate the signal strength datum and to compare the signal strength datum to a predefined signal strength threshold to thereby determine if the distance between the first and second radio frequency transceivers is less than a predefined distance that defines a home area proximate the controller;

wherein the processor circuit is programmed as part of the event-driven control loop to test whether the tool is within the home area using said signal strength comparison and to use said test as at least one operative step in the control loop that mediates the sequence of predefined assembly job steps.

2. The system of claim 1 wherein the first and second radio frequency transceivers operate according to a layered communication standard that includes a data link layer that mediates the transfer of data between the first and second radio frequency transceivers and that further includes a physical layer that regulates the physical connectivity between the first and second radio frequency transceivers, and which physical layer mediates the generation of said signal strength datum.

3. The system of claim 1 wherein the first and second radio frequency transceivers operate according to a WiFi protocol and wherein at least the second radio frequency transceiver measures signal strength of signals received at its antenna input and supplies said measured signal strength as the signal strength datum.

4. The system of claim 1 wherein the portable power tool has a case and wherein the second radio frequency transceiver and the processor circuit of the portable power tool are disposed within the case.

5. The system of claim 1 wherein the portable power tool includes a battery and wherein the second radio frequency transceiver and the processor circuit are energized by said battery.

6. The system of claim 1 further comprising at least one limit switch or sensor disposed on the production line and positioned to detect when a workpiece is positioned at said one of said work stations, the at least one limit switch or sensor generating a control signal that is supplied to the controller and that defines at least one operative step in the control loop that mediates the sequence of predefined assembly job steps.

7. The system of claim 6 wherein the control signal is communicated by the controller to the tool by wireless communication using said first and second radio frequency transceivers.

8. The system of claim 1 further comprising a second portable power tool having a second processor circuit that is programmed to cause the second tool to perform a second sequence of predefined assembly job steps that are mediated by the second processor circuit according to a second control loop running on the second processor circuit and associated with a second one of said work stations, wherein the second control loop running on said second power tool uses a signal strength datum in said second control loop to prevent the second power tool from operating with the first one of said work stations.

9. The system of claim 1 further comprising a second portable power tool electronically implementing a second control loop that relies on a signal strength datum to prevent the second power tool from operating at said first one of said work stations.

10. A method of operating an industrial power tool system for use on a production line having plural work stations, comprising deploying a controller at a predefined physical location within one of said work stations, the controller having a first radio frequency transceiver configured to propagate a digital communication signal at a predefined power;

providing a human operable portable power tool having a second radio frequency transceiver configured to communicate with the first radio frequency transceiver and providing a signal strength datum indicative of the received signal strength of the propagated digital communication signal of the first radio frequency transceiver;

using a programmed processor circuit with the portable power tool to cause the tool to perform a sequence of predefined assembly job steps that are mediated by the processor circuit according to an event-driven control loop running on the processor circuit;

using the programmed processor circuit to interrogate, as part of the event-driven control loop, the signal strength datum and to compare the signal strength datum to a predefined signal strength threshold to thereby determine if the distance between the first and second radio frequency transceivers is less than a predefined distance that defines a home area proximate the controller; and using the programmed processor circuit to test, as part of the event-driven control loop, whether the tool is within the home area using said signal strength comparison and to use said test as at least one operative step in the control loop that mediates the sequence of predefined assembly job steps.

11. The method of claim 10 wherein the first and second radio frequency transceivers operate according to a layered communication standard that includes a data link layer for mediating the transfer of data between the first and second radio frequency transceivers and that further includes a physical layer for regulating the physical connectivity between the first and second radio frequency transceivers, and further comprising mediating the generation of said signal strength datum using said physical layer.

12. The method of claim 10 wherein the first and second radio frequency transceivers operate according to a WiFi protocol and wherein at least the second radio frequency transceiver measures signal strength of signals received at its antenna input and supplies said measured signal strength as the signal strength datum.

13. The method of claim 10 further comprising energizing the second radio frequency transceiver and the processor circuit using a battery attached to the portable power tool.

14. The method of claim 10 further comprising generating a control signal by detecting when a workpiece is positioned at said one of said work stations using at least one limit switch or sensor disposed on the production line; and using said control signal to define at least one operative step in the control loop that mediates the sequence of predefined assembly job steps.

15. The method of claim 14 wherein the control signal is communicated by the controller to the tool by wireless communication using said first and second radio frequency transceivers.

16. The method of claim 10 further comprising providing a second portable power tool having a second processor circuit that is programmed to cause the second tool to perform a second sequence of predefined assembly job steps that are mediated by the second processor circuit according to a second control loop running on the second processor circuit and associated with a second one of said work stations; and using a signal strength datum in the second control loop to prevent the second power tool from operating with the first one of said work stations.

17. The method of claim 10 further comprising providing a second portable power tool electronically implementing a second control loop; and using a signal strength datum to prevent the second power tool from operating at said first one of said work stations.

18. A non-transitory computer readable medium that stores a program which when operated upon by a processor circuit causes the processor circuit to perform the following:

causing a portable power tool associated with said processor circuit to perform a sequence of predefined assembly job steps that are mediated by the processor circuit according to an event-driven control loop running on the processor circuit;

processing a radio frequency signal from a signal source to obtain a signal strength datum reflecting the strength of the radio frequency signal and comparing the signal strength datum to a predefined signal strength threshold; and using the signal strength comparison as at least one operative step in the event-driven control loop that mediates the sequence of predefined assembly job steps.

* * * * *